April 6, 1943.  O. B. SHAFER  2,315,741
VERIFYING MACHINE
Filed Sept. 28, 1939  8 Sheets-Sheet 1

FIG.1.

INVENTOR
Orville B. Shafer
BY
ATTORNEY

April 6, 1943. O. B. SHAFER 2,315,741
VERIFYING MACHINE
Filed Sept. 28, 1939 8 Sheets-Sheet 2

FIG. 2.

INVENTOR
Orville B. Shafer
BY
ATTORNEY

April 6, 1943.    O. B. SHAFER    2,315,741
VERIFYING MACHINE
Filed Sept. 28, 1939    8 Sheets-Sheet 5

April 6, 1943.  O. B. SHAFER  2,315,741
VERIFYING MACHINE
Filed Sept. 28, 1939  8 Sheets-Sheet 6

April 6, 1943.  O. B. SHAFER  2,315,741
VERIFYING MACHINE
Filed Sept. 28, 1939  8 Sheets-Sheet 7

FIG.14.

INVENTOR
Orville B. Shafer
BY
ATTORNEY

FIG.14a.

Patented Apr. 6, 1943

2,315,741

UNITED STATES PATENT OFFICE

2,315,741

VERIFYING MACHINE

Orville B. Shafer, Owego, N. Y., assignor to International Business Machines Corporation, New York, N. Y., a corporation of New York Application September 28, 1939, Serial No. 296,961

14 Claims. (Cl. 73—54)

This invention relates to verifying machines employed in the verification of perforated tabulating cards, and more particularly to improvements in devices of this class which are automatic in operation and electrically controlled.

The main object of the present invention is to make more efficient, render automatic and improve generally heretofore known verifier or error indicators of the character to which this invention appertains. Record cards as perforated for use in controlling accounting machines are generally provided with columns in which alphabetic data may be punched in the forms of combinational perforations. Other columns may be perforated to represent numerical data and certain columns may be set aside to receive special machine operation controlling perforations in predetermined positions in the columns. These special columns may at times be employed to receive numerical data as well as the special perforations so that such columns contain a plurality of perforations related to different things. In the initial punching of such cards, there is usually provided a set of alphabet punching keys, the depression of any one of which will cause a pair of holes to be punched in a card column representing the selected character. For punching digits in columns, there is usually provided a digital keyboard with a key for each separate digit and, where a special designation is made in a card column, a further key is provided for this purpose.

It is an object of the present invention to provide keyboard arrangements in which a separate set of keys is provided for verifying columns containing alphabetic designations and a separate keyboard is provided for verifying numerical and special designations, whereby the manipulation of keys to verify the card involves a procedure similar to that followed by the punching operator in initially punching the holes in the card.

A further object of the invention is to provide a pattern or master card, and checking devices are provided to automatically check the columns of the master card against the corresponding columns of each of the record cards to be verified, thus making it unnecessary for the operator to make a manual verification of these identically punched card columns.

A further object of the invention is to provide control means which is selectively settable to enable the operator, upon the detection of an error, to reverify the column or to require the removal of the card from the verifying mechanism upon the detection of an error.

The hereindescribed construction involves numerous advantages of automatic control operation not hereinbefore specifically referred to which contribute materially to produce a substantially completely automatic device which may be operated with consummate ease, rapidity and efficiency.

Other objects of the invention will be pointed out in the following description and claims and illustrated in the accompanying drawings, which disclose, by way of example, the principle of the invention and the best mode, which has been contemplated, of applying that principle.

Figure 1:
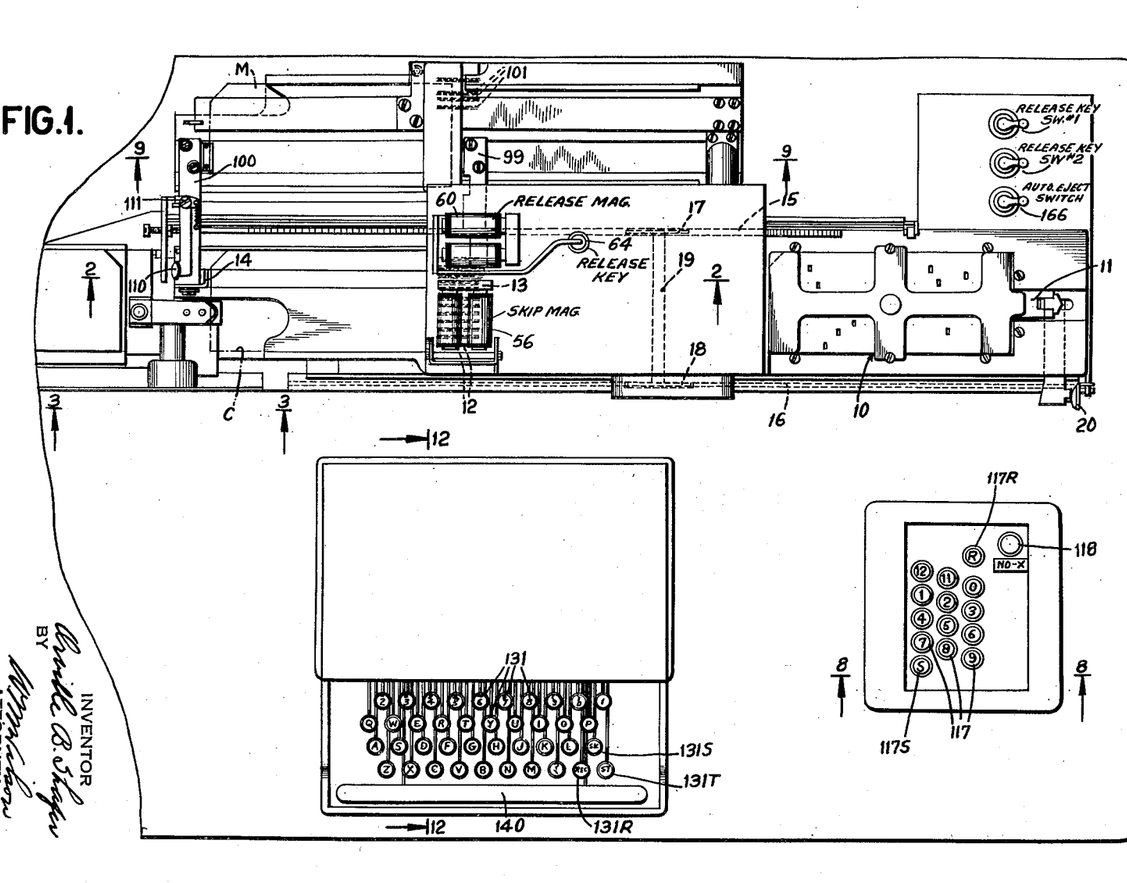
Fig. 1 is a plan view of the apparatus, showing the relative location of the card feeding and sensing mechanism with respect to the alphabetic and numerical keyboards.

The apparatus comprises three mechanically separate units; a card feeding and sensing unit shown in the upper part of Fig. 1, an alphabetic keyboard arrangement shown in the central part of the figure, and a numerical keyboard shown at the right of Fig. 1. The mechanical arrangement of the card feeding mechanism is substantially the same as that found in the machine known as "the International duplicating key punch," such as shown in Patent 1,914,263, granted June 13, 1933, to C. D. Lake et al. and Patent 2,107,161 granted Feb. 1, 1938, to R. E. Page. The latter patent also shows a numerical keyboard structure similar to that used in the present arrangement. Since most of the mechanical arrangement is already well known, the same will be but briefly explained in the following and in only so much detail as is necessary for an understanding of the present invention, and reference may be had to the patents cited for a further detailed explanation.

Card feeding mechanism

Figure 2:
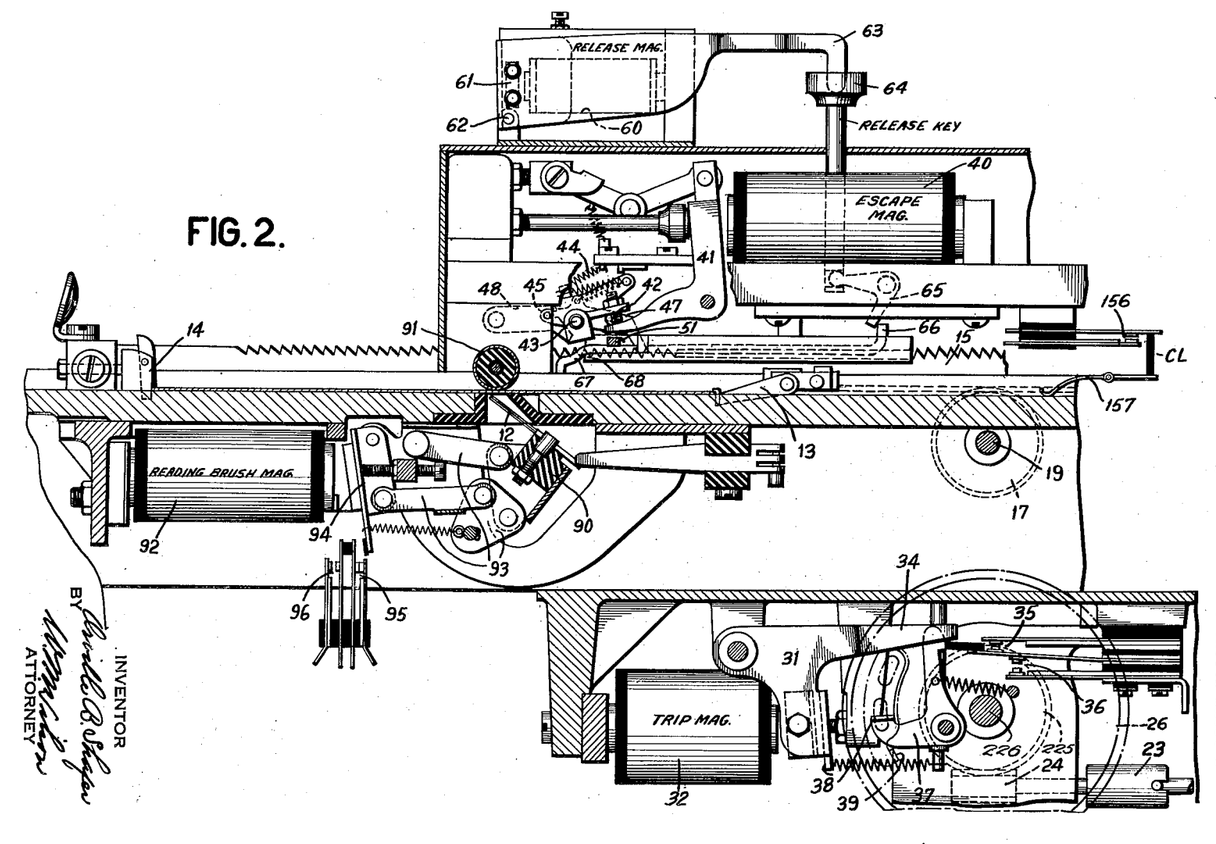
Fig. 2 is a section taken along lines 2—2 of Fig. 1, this section being through the record card sensing mechanism.
Figure 4:
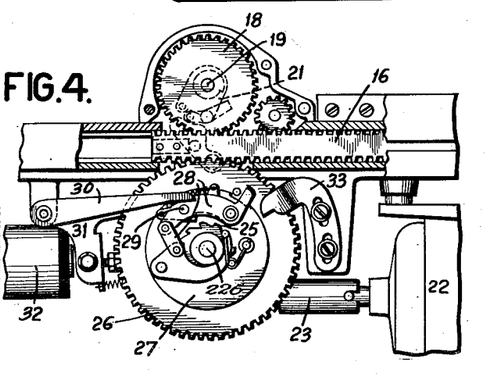
Fig. 4 is a detail showing the clutch connection between the card carriage mechanism and the driving motor.

Referring to Fig. 1, record cards C to be verified are placed in a magazine designated 10 from which they are advanced singly by means of a picker 11 toward the left to present their first column to a card sensing position above the sensing brushes designated 12 in Fig. 2. In this position the card carriage comprising a pusher 13 and a forward guide 14 engages the card and advances it step by step under control of the escapement mechanism to be described later. Pusher 13 and guide 14 are carried by an escapement rack 15 and the picker knife 11 is carried by a rack bar 16. Rack 15 has a gear 17 meshing with its lower edge (see Fig. 2) and bar 16 has a gear 18 (see Fig. 4) meshing with its upper edge, both gears being mounted on a cross shaft 19 (see Fig. 1). Due to this connection between the elements, the movement of picker 11 toward the left as viewed in Fig. 1 is accompanied by movement to the right of pusher 13 and forward guide 14. At the commencement of operations, the picker and pusher are in the position shown in Fig. 1.

The rack 16 is provided with a finger piece 20 at its right hand extremity by means of which the rack 16 and the picker 11 may be moved toward the left to feed a card from the magazine 10. This movement is accompanied by movement of the pusher 13 in the opposite direction, the parts being so proportioned that, when the card has been advanced to present its first column to the sensing brushes 12, the pusher 13 will have moved toward the right sufficiently to engage the right hand or trailing edge of the card and will now control the further advancement thereof in response to the operation of the escapement mechanism. A one-way clutch mechanism generally designated 21 in Fig. 4 permits the immediate return to the right of bar 16 and picker 11 under control of a spring (not shown).

The operation of card feeding just outlined is more fully explained in Patent 1,772,186 granted to F. L. Lee et al. for a duplicating punching machine. The escapement mechanism referred to is of the same general nature as that disclosed in the Schaaf Patent 1,426,223 and a brief description thereof will be given later.

Secured to the under side of the base of the machine is a motor 22 (Fig. 4) coupled to a stub shaft 23 (see Fig. 2), to which is secured a worm 24 in mesh with a worm wheel 225 secured to a shaft 226, one end of which has secured thereto a ratchet-shaped clutch element 25. Loosely mounted on shaft 226 is a gear 26 meshing with teeth on the lower edge of rack bar 16 and on which gear is mounted a disc 27. Mounted upon disc 27 is a clutch mechanism generally designated 28, one element of which is provided with a pin 29 positioned for engagement by a finger 30 integral with the armature 31 of a magnet 32. With the machine at rest, the parts occupy the position shown in Fig. 4 and, when magnet 32 is energized, the finger 30 will operate the clutching mechanism to couple the disc 27 to the rotating ratchet 25, so that the disc 27 and gear 26 are rotated counterclockwise to drive the rack bar 16 toward the left. The clutching mechanism is constructed, as explained in greater detail in the patents referred to, so as to remain in engagement for substantially a complete revolution, at the completion of which time the clutching mechanism engages a fixed member 33, which effects uncoupling of the parts, whereby they may automatically return to the position shown in Fig. 4 under the influence of a spring (not shown). This power drive of rack bar 16 toward the left has the same effect as the manual movement thereof previously explained, that is, a card will be advanced to sensing position and the pusher 13 will engage the same for further step-by-step advancement, and rack bar 16 may thereafter return to its home position without disturbing the advanced position of the card or pusher 13, this being permitted by the one-way clutch structure 21 mentioned above.

Also integral with the armature 31 of the trip magnet 32 is an arm 34 (see Fig. 2), the free end of which is adapted to bear upon the center blade of pairs of contacts 35 and 36 to open the former and close the latter when magnet 32 is energized, and they will be maintained in such shifted position by a latching bell crank 37, the lateral extension 38 of which is adapted to be engaged by a plate 39 secured to gear 26 at the termination of the driving movement of the latter. The contacts 35 and 36 are used to control the energization of the driving motor 22 and their function will be more fully explained in connection with the circuit diagram.

Escapement mechanism

When the card is in position above the sensing brushes 12 (Fig. 2), further advance is controlled by the escapement mechanism which in turn is responsive to the energization of escape magnet 40. Upon energization of magnet 40, its armature 41 will be rocked about a pivot in a clockwise direction and through a screw 42 secured to rod 43 will rock the rod 43 counterclockwise against the tension of a spring 44. The rod 43 is rocked as an incident to each spacing operation and has secured to one end thereof oppositely extending arms 45, 46 (see also Fig. 6), of which arm 46 is provided with a laterally extending pin for engagement with an enlarged opening in a stepping dog 47 which is loosely pivoted on rod 43. Opposite arm 45 is provided with a pin extending into a slot formed in the locking dog 48. When rod 43 is rocked, arm 46 will, through its pin and slot connection with dog 47, lift the latter out of one of the notches of the rack 15 and at the same time arm 45 will depress locking dog 48 into a notch between the rack teeth. At this time a spring 49 advances the loosely pivoted dog 47 a short distance just sufficient to permit this dog to move above the top of the next tooth. When the locking dog is again raised, stepping dog 47, due to the movement of rack 15, will ride down along the next tooth until it strikes the end thereof and the carriage is thereby arrested. The usual spring drum (not shown) is provided to bias the rack 15 toward the right as viewed in Fig. 6. The detailed structure in this dog and rack arrangement is well known and need not be further described, and it is sufficient to note that for each operation of the space magnet 40, the rack 15 is advanced one step or tooth, carrying with it the pusher 13 and forward guide 14, so that the card is likewise advanced one step, each step of advancement being coextensive with the columnar spacing of the columns of the card.

Skip bar

The machine is provided with the usual skip bar indicated at 50 (Figs. 6 and 7) which is removably attached to the escapement rack 15 at one side thereof and provided with suitable notches and cam surfaces which cooperate with the usual skip lifter arm 51 which has a beveled end 52. The end of the lifter 51 lies under the dog 47 so that, if lifter 51 is moved toward the left as viewed in Fig. 7, at any time that a high portion of the skip bar is in line therewith, the beveled end of the lifter will cooperate with the cam surface of the bar to raise the end of the lifter which, upon being so raised, elevates the dog 47 to release rack 15. The lifter arm 51 will drop into the next notch in bar 50 and dog 47 will interrupt further movement of the rack beyond such point. The function of this skip bar 50 is to skip over the columns or fields which are not to be verified. The right end of the lifter 51 is connected to a slider 53 whose right hand end is provided with an opening into which the free end of a finger 54 extends. This finger is integral with armature 55 of skip magnet 56, the armature being pivoted at 57. With this arrangement, energization of magnet 56 will cause lateral shifting of skip lifter 51 with consequent skipping operations. Upon deenergization of magnet 56, the parts are returned to normal by a spring 58. Located above skip lifter 51 is a pair of contacts 59 which are closed when the lifter arm 51 is tilted by virtue of engagement wtih a high portion of skip bar 50. The purpose of this pair of contacts will be explained in connection with the circuit diagram.

Figure 7:
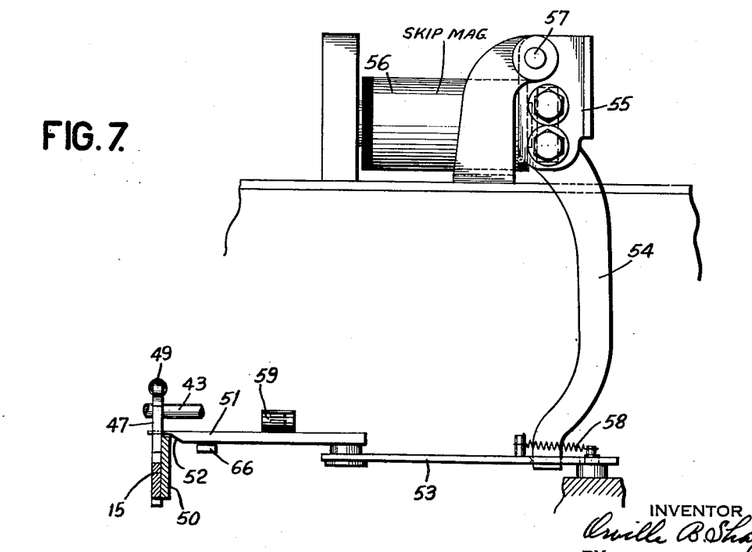
Fig. 7 is a detail of the skip magnet and the mechanism controlled thereby.

A further means by which the card may be advanced is controlled by a release magnet designated 60 (Fig. 2) which, when energized, will rock its armature 61 about pivot 62 causing the free end of an integral finger 63 to depress a release key 64. The mechanism controlled by this key is well known in this type of machine and is briefly as follows. The lower end of key 64 through the bell crank 65 will draw a member 66 toward the right as viewed in Fig. 2. This member 66 is suitably mounted for such movement and at its left hand end is provided with a cam surface 67 which cooperates with the edge 68 of the supporting plate. The member 66 also extends beneath the skip lifter 51 in a position generally as indicated in Fig. 7, so that as the member 66 is moved toward the right, cam 67 cooperating with plate 68 will cause an upward tilting of the left end of the member which in turn will lift the arm 51 upwardly against the stepping dog 47, whereupon the rack will be free to advance uninterruptedly toward the left. Frictional engagement of the parts will maintain the member 66 in its shifted position so that the escapement of the rack, when initiated by the magnet 60, will not be interrupted until the card has been fully advanced, that is, until the last card column is advanced to the sensing position.

At this time a suitable projection carried by the rack will engage a depending extension of the left extremity of member 66 and will draw the member toward the left back to the position it occupies in Fig. 2. Briefly summarizing, after the card has been initially advanced to present the first card column to the sensing brushes 12, its further advance is controlled for column-by-column movement through the space magnet 40. Multiple column advancement is controlled through the skip magnet 56 in cooperation with the skip bar 50, and the complete release of the card from any position to its last column position is controlled by the release magnet 60.

Automatic card ejector

Figure 3:
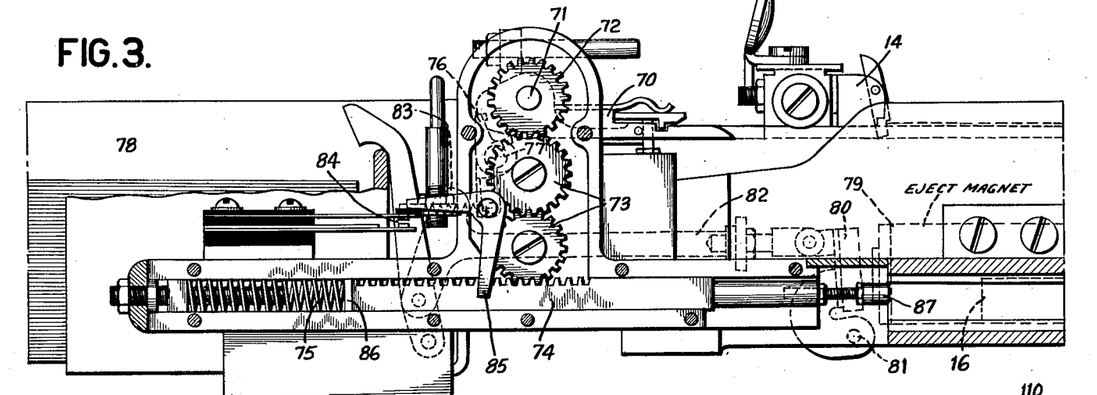
Fig. 3 is a view of the left end of the card feeding mechanism showing the card ejecting devices, the view being taken substantially in the direction of the lines 3—3 of Fig. 1.

The machine is provided with mechanism for automatically removing completely sensed cards and depositing the same in a receptacle provided for the purpose. This mechanism is more fully shown and described in Patent 1,916,965 issued July 4, 1933, to J. M. Cunningham. Briefly, a gripper 70 occupies the position shown in Fig. 3 with its jaws open in card receiving position during the period that the card is advanced by the escapement mechanism. The gripper is carried by the rod 71 to which is secured a gear 72 which through idlers 73 is connected to a slidable rack 74 which is normally biased toward the right by a spring 75. A pivoted latching member 76 engages a latching shoulder at the left hand extremity of the gripper and thereby serves to hold the parts in the position shown in Fig. 3. When the latching member 76 is rocked counterclockwise about its pivot 77, the spring 75 will be free to drive the rack 74 toward the right and, through the gearing 73, 72, flip the gripper 70 in a counterclockwise direction. This flipping action is effected after the card has been advanced to its extreme left hand position, at which time the leading edge thereof is between the jaws of the gripper. Releasing the gripper will cause the jaws to automatically clamp the end of the card thereto so that the card will be swung in an arc about the rod 71 and deposited in the receptacle 78, suitable means being provided to cause the jaws to release the card.

For the purpose of actuating the latch member 76 there is provided the usual eject magnet 79 which, when energized, will rock its armature 80 about pivot 81 and draw a link 82 toward the right. The left extremity of the link is provided with an extension 83 which, when the link is moved, will strike a depending arm of the latch member 76 and effect the rocking action thereof which results in the ejection of the card by the gripper. This ejecting operation will bring about the automatic feeding of another card from the magazine 10 to the sensing brush. This operation is initiated by means of a pair of automatic start contacts designated 84 which are closed through a pivoted bell crank 85, a depending arm of which is engaged by an extension 86 in rack 74 when the rack has been released for movement toward the right.

In a manner to be explained in connection with the circuit diagram, the contacts 84 control the operation of the driving motor which, as explained, will cause advance of a new card from the magazine and also cause movement toward the right of card pusher 13 and forward guide 14. As the rack 16 is moved toward the left, its left hand end will engage an adjustable extension 87 carried by the rack 74 which will positively restore the rack toward the left and through the gearing shown will return the gripper to the position it occupies in Fig. 3, the latch member 76 being spring-biased to engage and hold the gripper in such position until the newly advanced card has been verified and advanced to its last column position, whereupon the automatic ejection and initiation of a new card feeding operation will take place.

Card sensing mechanism

The card sensing brushes 12 are shown in Fig. 2. There are provided twelve of these brushes positioned side by side, there being one for each of the usual twelve rows of index point positions of the card. The brushes 12 are mounted in an insulating brush holder 90 which is mounted so that the brushes 12 are given substantially a vertical movement upwardly from the position shown in Fig. 2 to contact the card and effect electrical connections through the perforations therein with a common contact roller 91. The upward movement of the brushes 12 is controlled by the reading brush magnet 92 which, when energized, will cause the brushes 12 to move upwardly through mechanism generally designated 93. This mechanism is of the usual construction and detailed description thereof may be found in the patents referred to. Its purpose is generally to maintain the brushes in their lower position, when they are not actually sensing perforations in the card, and thereby preserve them against undue wear and also against damage by any inadvertent backward movement of the record cards. The armature 94 of magnet 92 is arranged when attracted by the magnet to open a pair of contacts 95 and close a pair of contacts 96, whose function will be explained in connection with the circuit diagram.

Master card sensing mechanism

Figure 9:
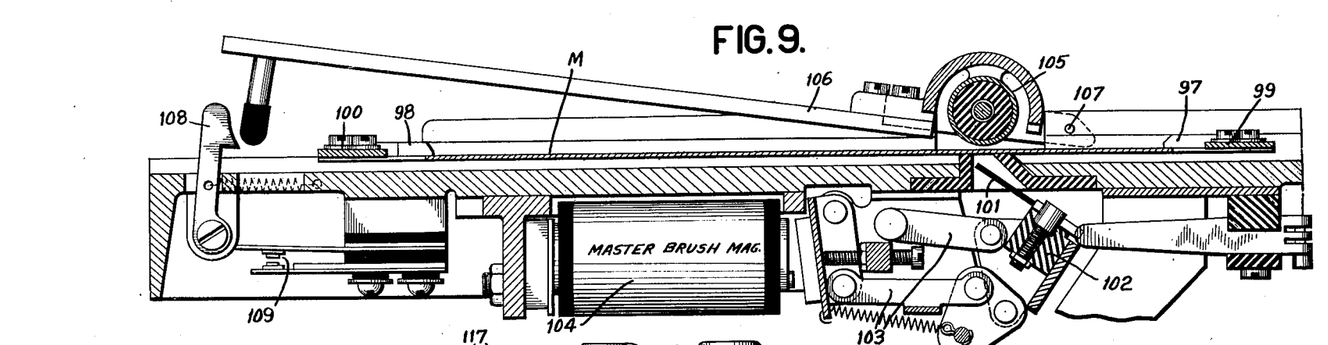
Fig. 9 is a section along lines 9—9 of Fig. 1 showing the sensing mechanism for the master or pattern card.

Referring to Figs. 1 and 9, a master card designated M may be placed in the machine in parallel alignment with the cards C. This card is held in position between a pusher 97 and a forward guide 98 which are carried by cross arms 99 and 100 respectively, which arms are extended from the escapement rack 15 (see also Fig. 5). The card M is manually placed in position and travels back and forth with the card carriage. The operation is such that the card is advanced step by step past a set of brushes 101 for each of the successively fed cards C, and as each of the columns of the cards C pass their sensing brushes 12, the corresponding card columns of the card M concurrently pass their sensing brushes 101. For the purposes of the present invention, there are provided only three brushes 101 for sensing the so-called zone positions of the card columns, that is, the positions designated 0, 11 and 12 (Figs. 10 and 11), and the master card is only provided with perforations in these positions. The brushes 101 are mounted on an insulating block 102 and are moved vertically into contact with the card through linkage generally designated 103 which is controlled by the master brush magnet 104. The cooperating contact arm 105 is supported in the gate or door 106 which is pivoted at 107 and which, when the master card M has been placed in position, is rocked downwardly into closed position, where it is held by a spring-pressed latch 108. The free end of the gate is provided with a plunger which effects closure of so-called door contacts 109.

Figure 5:
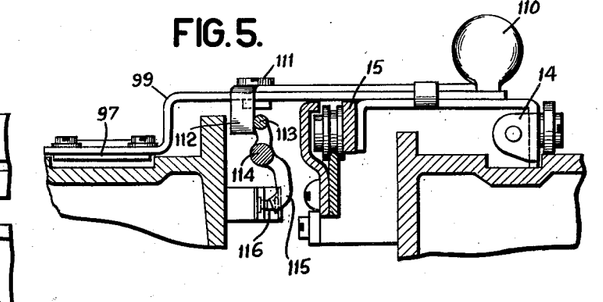
Fig. 5 is a detail of certain parts of the card feeding mechanism.

Referring to Fig. 5, there is mounted on the cross arm 99 a finger piece 110 pivoted at 111 (see also Fig. 1), which finger piece also has a depending arm 112. When it is desired to manually back-space the cards, it is done by pressing against the finger piece 110, whereupon a slight rocking thereof is effected before the card carriage actually moves. During this slight rocking, the extension 112 will rock a universal bar 113 about its pivot 114 to cause a depending arm 115 thereon to open the so-called cut-out contacts 116. These contacts are in the master and reading brush magnet circuits and are provided to insure that these magnets are deenergized and their related brushes in down position before there is any backward movement of the cards which might injure the brushes.

Numerical keyboard

Figure 8:
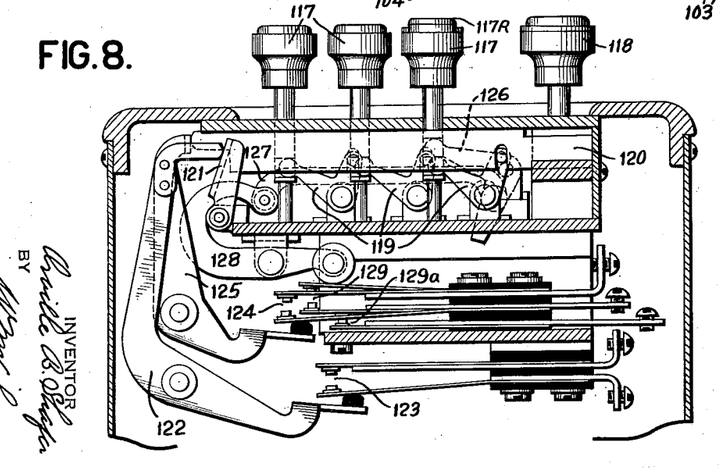
Fig. 8 is a section taken along the line 8—8 of Fig. 1 showing the arrangement of the numeral keys.

In Fig. 8 is illustrated the numerical keyboard in which a key 117 is provided for each of the twelve index point positions of the card in addition to a reset key 117R, a space key 117S, and a so-called No-X key 118. Depression of any key 117 will rock a bell crank 119 which through a pin and slot connection will move a slider 120 toward the left as viewed in Fig. 8. Each of the sliders cooperates at its left end with a bail 121 to rock the same counterclockwise and the bail in turn will rock a lever 122 to close a pair of contacts 123. Contacts 123 are common to all of the keys 117 and are closed upon depression of any one of said keys. Individual contacts 124 of which there is one pair for each key 117 are also closed by depression of a key.

There is one slider 120 for each of the keys, which slider is urged to the left upon depression of its associated key and for each slider there is also a lever 125 which is rocked to close the associated pair of contacts 124. The key 117S operates a similar slider 120 and lever 125 to close a pair of contacts (not shown in Fig. 8 but designated in circuit diagrams, Fig. 14, as contacts 124S). Also, for key 117R there is a separate bell crank 126 (Fig. 8) to which is connected a link 127 pivoted to a curved lever 128 which, when the key 117R is depressed, will be rocked clockwise to close a pair of contacts 129. The No-X key 118, when depressed, also closes a pair of contacts not shown in Fig. 8 but designated in Fig. 14 of the circuit diagram as contacts 130. These keys and their contacts are mechanically independent of the remainder of the mechanism and may be located in relation to the remainder of the apparatus as shown in Fig. 1 for convenient right hand operation.

Alphabetic keyboard

Figures 12, 13:
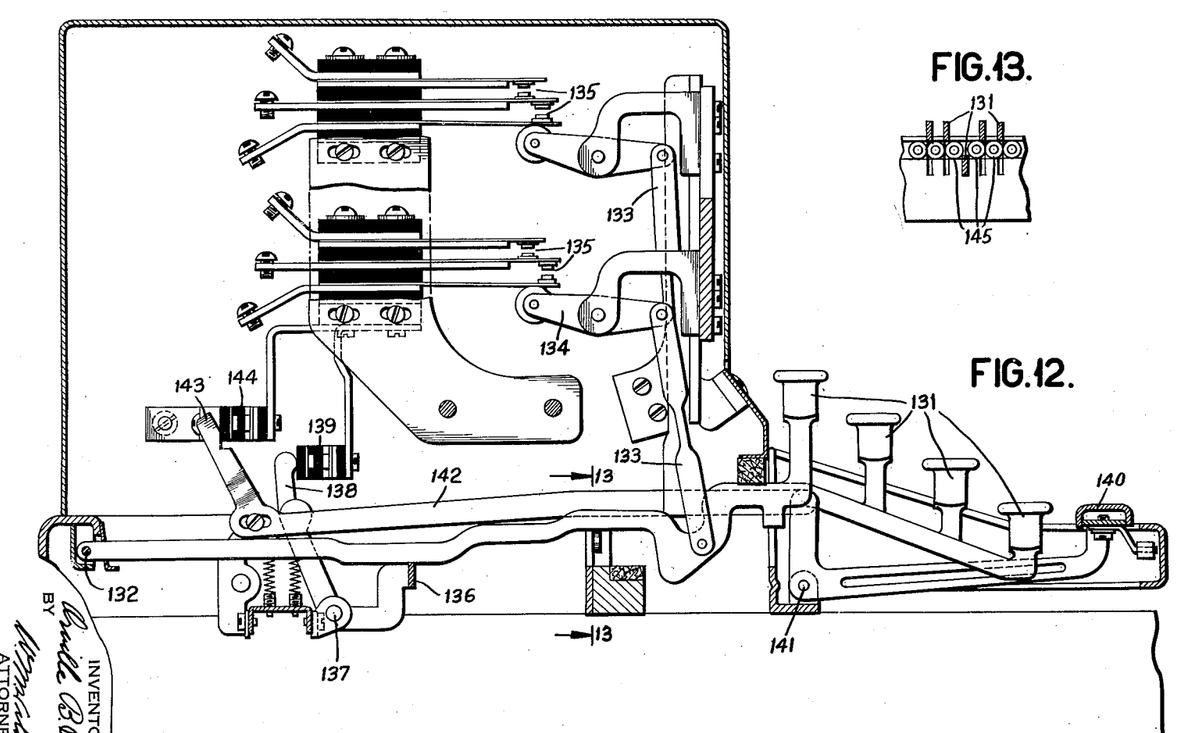
Fig. 12 is a section along the lines 12—12 of Fig. 1 showing the contacts operated under control of the alphabetic keyboard.
Fig. 13 is a detail of the key interlock, the section being taken along the lines 13—13 of Fig. 12.

In Figs. 1 and 12 are shown the arrangement of the alphabetic keys. This section is also an independent unit located as shown in Fig. 1 for convenient manipulation by the operator. The keys are marked with numerals and letters in accordance with standard keyboard arrangement and each of the keys is arranged to close one or a pair of contacts in accordance with the coding assigned to the respective keys. These keys are designated 131 and are pivoted at 132 and the key, when depressed, will through the medium of a link 133, rock a lever 134 to cause closure of pairs of contacts 135. Underlying all the keys 131 is a bail 136 pivoted at 137 provided with an upwardly extending arm 138 which causes closure of a pair of contacts 139, so that operation of any key 131, in addition to closing its contact 135, also closes contact 139, the parts being so adjusted that the contacts 135 are closed before contacts 139 close and open after contacts 139 again break. The keyboard is also provided with three additional keys 131S, 131R and 131T identified as the skip, release and stacker keys respectively. These keys, when operated, close contacts similar to contacts 135 and are designated on the circuit diagram as contacts 135S, 135R and 135T. The space bar 140 is secured to an arm pivoted at 141 which, through link connection 142 provided with extension 143, is arranged to close a pair of contacts 144. In Fig. 13 is shown the interlock for the keys 131 wherein discs 145 prevent the depression of more than one key at a time.

Miscellaneous contacts

Several contacts in addition to those described are provided in the machine, and the operation of these will be pointed out before the entire operation of the apparatus is explained in connection with the circuit diagram.

Figure 6:
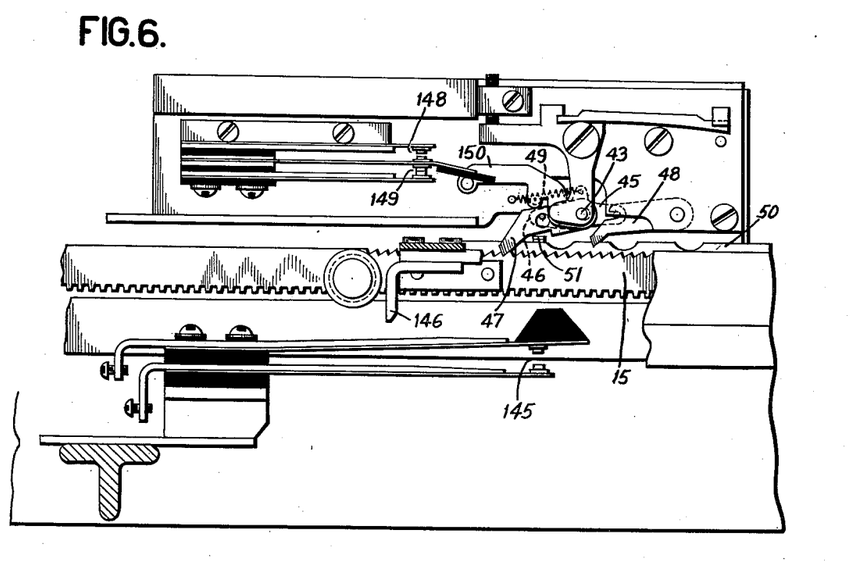
Fig. 6 is a detail (looking in the opposite direction to Fig. 2) of the card carriage escapement mechanism.

In Fig. 6 is shown a pair of contacts 145 known as the "last column contacts." These contacts are closed by an arm 146 secured to the escapement rack and so located that, when the escapement rack is advanced to the position in which the last column of the card is presented to the sensing brushes, the extension 146 will be in engagement with and close contacts 145. In the same figure are shown contacts 148 and 149, whose common blade is shifted by an arm 150 which is loosely pivoted on the rod 43 and which has a lateral extension resting upon the upper edge of the stepping dog 47 so that during escapement from one column to another, the incidental raising of the stepping dog 47 through arm 150 will cause opening of contacts 149 and closure of contacts 148 during the period that the dog is raised. In Fig. 2 there is shown a card lever 157 lying in the path of the record card as it passes from the magazine to the sensing position. When a card feeds from the magazine, it causes rocking of the card lever to permit closing of a pair of contacts designated 156.

The record cards

Figure 10:
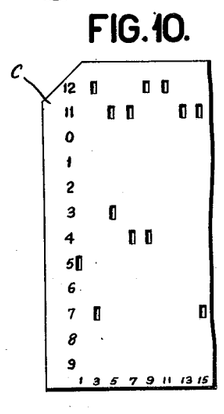
Fig. 10 is a fragment of a card whose punchings are to be verified.

Before explaining the general operation of the machine in connection with the circuit diagram, an explanation will be given of the various punching arrangements that may occur in a column of the record card to be verified and to explain the purpose of the master or pattern card M. In Fig. 10 is shown a fragment of a record card C with several columns perforated in a representative manner. The card has the usual twelve index point positions in which digits are recorded by a perforation in the corresponding digital index point position. The alphabetic characters are represented by the combination of two perforations, one occurring in one of the digital positions 1 to 9 and the second occurring in the so-called "zone" positions 0, 11, 12. The complete coding arrangement for the alphabet is as given in the following table where the numerals following the letter indicate the two index point positions that are perforated in a column to represent that letter.

| A 12—1 | J 11—1 |        |
|--------|--------|--------|
| B 12—2 | K 11—2 | S 0—2  |
| C 12—3 | L 11—3 | T 0—3  |
| D 12—4 | M 11—4 | U 0—4  |
| E 12—5 | N 11—5 | V 0—5  |
| F 12—6 | O 11—6 | W 0—6  |
| G 12—7 | P 11—7 | X 0—7  |
| H 12—8 | Q 11—8 | Y 0—8  |
| I 12—9 | R 11—9 | Z 0—9  |

In Fig. 10 the column 1 is perforated to represent the digit 5, column 3 is perforated to represent the letter G, and column 5 is perforated to represent the letter L. When column 1 is under the sensing brushes, ready to be verified, the operator may depress either the 5 key 117 or the 5 key 131 and, if there is a 5 hole in column 1, the card will escape to the next column. If this column is one in which an alphabetic character is recorded, the operator will press the appropriate alphabetic key 131 and, if the perforations correspond to the coding for that character, the card will escape to the next column.

There are occasions where a card column contains two perforations in which these perforations do not represent an alphabetic character. Thus, for example, in column 7 (Fig. 10) there is a perforation in the 4 and another in the 11 position. The 4 perforation represents the numeral "4," while the 11 perforation represents what is known as an "X hole." A similar perforation as in column 9 (Fig. 10), when made in the 12 position represents what is known as a "12 hole" and is utilized in statistical machines for various control purposes. These X and 12 holes are utilized to control the operation of the tabulating machine to perform special functions, such as subtracting and class selecting operations, and may be made in columns in which other non-related numerical data is punched.

In the design or data arrangement of the tabulating cards, the particular columns in which the X and 12 holes are to be punched are predetermined. The operator in punching a card will perforate the required numerical information and also the X or 12 hole in the predetermined column or columns as required. In verifying these columns the verifying operator, when a column such as column 7 is in sensing position, will first operate either the X or 11 key 117 or the 4 key 117 and thereafter the other of these two keys in order to correctly check the perforations in this column. Likewise, when column 9 is presented to the sensing brushes, the operator will first press either the 12 key 117 or the 4 key 117 and then the other key.

For the purpose of obtaining a correct checking of these special punched columns for reasons which will more fully appear during the explanation of the circuit diagram, the master card M is provided, and in each case where the card C is designed to be provided with an X hole in a particular column the corresponding column of the card M is perforated in the zero position. In the initial preparation of the card C, a particular column is predetermined to receive the special control perforation in the X or the 12 position. The absence of the special control holes in such predetermined column also has a significance in the later operation of statistical machines, and it is necessary to verify that in cases where the column is not to be specially punched, the punch operator has not inadvertently made an X or 12 hole when such should be omitted. To check this the card M is provided with a zero hole in each column corresponding to the so-called "X hole" columns of card C. When any such column is in verifying position, the operator presses the X or the 12 key 117 as the case may be if the card C is intended to have either of these holes in the column. If the X or 12 hole is intended to be omitted, the operator must nevertheless press the No-X key 118 in order to complete the verification and determine that no X or 12 hole has been inadvertently made. Thus if, for example, column 1 were one of these special control columns, the corresponding column of card M would have a zero hole therein and as will be explained later, the operation of the 5 key will not be enough to cause spacing and the operator must in addition press the No-X key 118.

Figure 11:
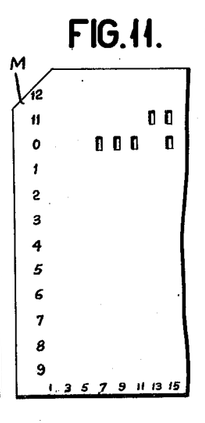
Fig. 11 is a fragment of a master or pattern card.

In Fig. 11, there are zero perforations in the 7, 9, 11 and 15 columns of card M, indicating that the corresponding columns of the card C (Fig. 10) are set aside as special control columns and have either an X or No-X perforation. It is to be noted in column 11 of card C the X hole is made in a column in which no numerical perforation is printed. For verifying this column 11, it is necessary for the operator to depress the X key 117 and thereafter the space key 117S in order to advance the card. If the special column 11 had no perforations, or, in other words, showed a No-X condition, the operator is required nevertheless to press both the No-X key 118 and the space key 117S, thus checking the correctness of the No-X condition. In any other columns other than the special columns, a blank condition is checked by the depression of either the space key 117S or space bar 140 alone.

The columns in which an X hole has been made by some automatic method as, for example, in a gang punch so that it is known that such perforation occurs unquestionably in all cards, it is unnecessary for the operator to separately test such column for the occurrence or absence of the X hole. The master card M is perforated in the 11 index point position in columns corresponding to those of the C cards containing gang punched X holes. The effect of punching the corresponding hole in the master card M is to cause the machine to automatically vertify the gang punch hole and effect automatic spacing. Similarly, if the gang punch hole is in the 12 position, the correspondingly located hole is perforated in the master card. The effect of this is to cause the machine to automatically compare each of these columns of the two cards and space from column to column without any intervention on the part of the operator.

Where the column in which a gang punched X or 12 hole is made there is also effected a numerical punching which the operator is to verify, the master card in the corresponding column contains the corresponding X or 12 hole and, in addition thereto, contains a perforation in the zero position. When such column is presented, the operator need only press the key corresponding to the numerical perforation.

The above outlines the various perforating conditions which may confront the operator and the manner in which the machine functions in handling each of these conditions will now be set forth in connection with the circuit diagram.

*Circuit diagram*

Figure 14:
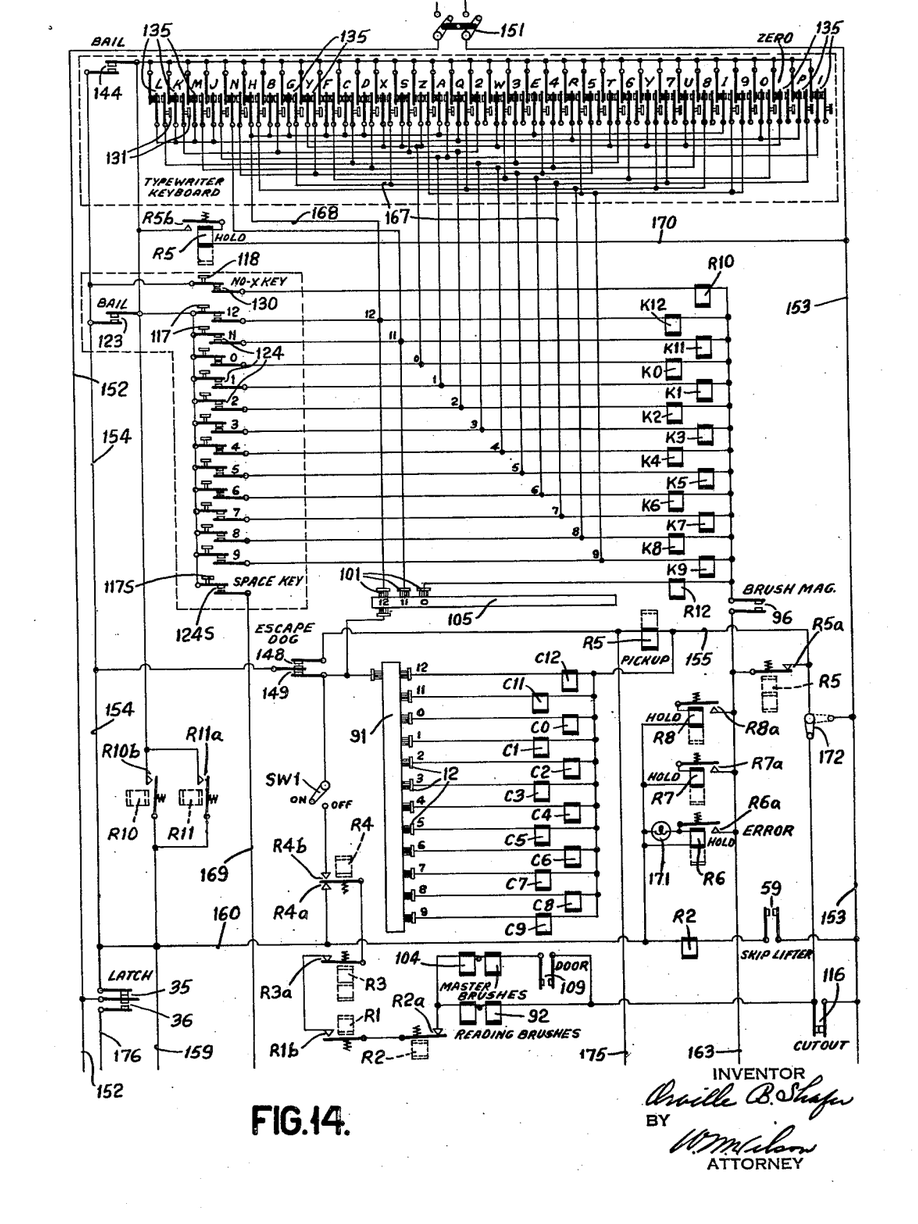
Figs. 14 and 14a placed one above the other constitute a wiring diagram of the electric circuits of the apparatus.
Figure 14A:
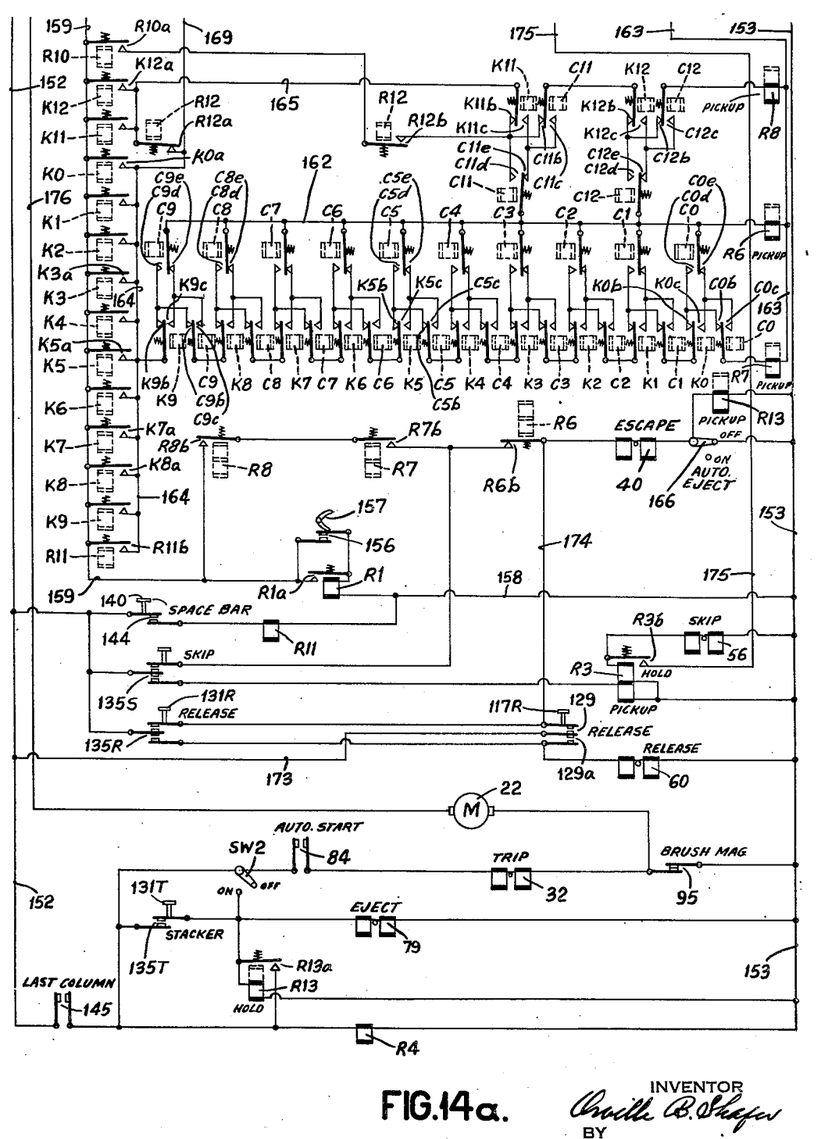

Referring to Figs. 14 and 14a, current is supplied from a suitable source through a switch 151 to the left side of line 152 and right side of line 153 and, with cards to be verified placed in the magazine 10 (Fig. 1), the machine is ready to commence operations.

Assuming that, at the termination of some prior operations, the rack 15 (Fig. 1) were left in its left hand position, such commencement would take place by manually moving the finger piece 20 toward the left so that picker 11 would feed the first card from the bottom of the magazine 10 into sensing position, this operation being accompanied by movement toward the right of rack 15, whereupon pusher 13 and guide 14 would take over the subsequent control of the movement of the card. At this time, the first column of card C is in position above brushes 12 and the first column of card M is in position above brushes 101. When a column to be verified is at the brushes, one or more of the relay magnets prefixed C (Fig. 14) is energized in accordance with the number and position of the perforations in the column. Considering the column in question to contain a 5 perforation, a circuit will be traceable from line 152, contacts 35 (Fig. 14), wire 154, contacts 149, contact roller 91, perforation in the 5 position, to the brush 12, relay magnet C5, wire 155, contacts 116 to line 153.

Before this circuit is completed, it is necessary to raise the sensing brushes into contact with the record cards and this is controlled as follows: As the card advances from the magazine to the sensing position, the card lever 157 is operated to close contacts 156 (Fig. 14a). The closure of these contacts establishes a circuit traceable from line 153, wire 158, relay magnet R1, contacts 156, wire 159 (Fig. 14), contacts 35 to line 152. Relay R1 closes its contacts R1a to provide a holding circuit which will maintain the relay energized throughout subsequent operations and until contacts 35 open as an incident to the feeding of the next card from the magazine.

Relay R1 has a pair of contacts designated R1b (Fig. 14) which, upon closure, complete a circuit from line 153, through contacts 116, reading brush magnet 92, a pair of relay contacts R2a, contacts R1b, a pair of relay contacts R3a, a further pair of relay contacts R4a, wire 160, contacts 35 to line 152. With the master card in position and the door closed so that contacts 109 are closed, the master brush magnet 104 will be energized in parallel with the reading brush magnet 92. As a consequence of the energization of magnet 92, the brushes 12 are moved into contact with the cards so that the aforedescribed circuit through the relay magnet C5 will be completed.

It may be pointed out at this time that in the circuit diagram various relay contacts are shown in positions remote from their controlling coils or windings. This has been done in order to simplify the wiring and eliminate numerous cross connections. In order to readily identify the various elements, however, the relays are designated with the prefix R followed by a numeral and the related contacts are given the same reference character as the relay followed by a lower case letter. In addition, the controlling coil for the contacts is shown in dotted outline adjacent the contacts controlled thereby.

The operator now depresses the 5 key 117 causing the closure of the related contacts 124. Operation of the key as explained in connection with the mechanical structure also causes closure of the bail contact 123 so that a circuit is now completed from line 152, contacts 35, wire 154, contacts 123, the 5 contacts 124, the relay magnet K5, brush magnet contact 96 (now closed due to energization of magnet 92), relay contacts R5a, contacts 116 to line 153.

In Fig. 14a each of the relay magnets K is shown as provided with a pair of contacts which are designated generally by the suffix a, such as K9a, K8a, etc. and also with a second set of contacts with the suffix b and also a third pair of contacts with the suffix c. In this figure there are shown contacts controlled by the C relays, there being b, c, d and e contacts for each of the C relays. For example, the relay C9 when energized opens a pair of contacts C9b and closes a pair of contacts C9c. Also, when energized, magnet C9 closes a pair of contacts C9d, opens a pair of contacts C9e. The b and c contacts of the C magnets are shown adjacent to the corresponding b and c contacts of the related K magnets and wired so that a series circuit extends normally through the b contacts of both the K and C magnets, beginning with contacts K9b and extending serially through contacts C9b, K8b, C8b, K7b, C7b, etc. through C0b to a so-called verification relay R7. This series circuit is controlled by the C and K magnets 0 to 9 inclusive. The C and K magnets 11 and 12 and their b contacts control a separate series circuit running from contacts K11b through contacts C11b, K12b, C12b, to a second so-called verification relay magnet R8.

The c contacts of any related pair of magnets K and C are wired to create a shunt around the associated b contacts when both the K and C magnets are energized. Thus, for example, if magnets K9 and C9 are both energized, the series circuit will run from contacts K9c to contacts C9c and thence to contacts K8b and from then on as before to the verification magnet R7.

Similarly, if magnets K11 and C11 are both energized, the circuit for the second verification magnet R8 will run through the contacts K11c, and C11c. It will be apparent therefore that, if any of the K or C magnets are energized without accompanying energization of the corresponding C or K magnet respectively, the circuit related to the verification magnet R7 or R8 is not completed. When any such non-conformity occurs, a circuit will be completed to energize an error relay R6 which may be explained by a specific illustration. Assuming that the K9 magnet is energized without accompanying energization of magnet C9, there will be a circuit from contact K9c through contacts C9e, wire 162 to the magnet R6. Conversely, if magnet C9 is energized without accompanying energization of magnet K9, a similar circuit is traceable from contacts K9b to contacts C9d and wire 162 to the magnet R6. Likewise, for the arrangement including the K and C magnets for the 11 and 12 positions, if magnet K11 is energized without accompanying energization of magnet C11, a circuit follows from contacts K11c, through contacts C11e, wire 162 to magnet R6, and again if magnet C11 is energized without accompanying energization of magnet K11, the circuit will run from contact K11b, through contacts C11d, wire 162 to magnet R6.

Briefly summarizing the operation of the verifying or checking circuits, they are divided into a pair, one of which is controlled by the 11 and 12 keys and index point positions while the other is controlled by the 0 to 9 keys and index point positions. In either of the pair of checking circuits a circuit path is provided when a pair of related K and C magnets is energized or when none of them are energized. When either a K or C magnet is energized without accompanying energization of the other magnet, the circuit path for the R7 or R8 magnet is broken and a circuit path is provided for the error magnet R6.

Continuing now the operation of the machine when a card column containing a 5 perforation is verified, we have the magnets K5 and C5 energized. A complete circuit can now be traced from line 152 (Fig. 14), contacts 35, wire 159 (Fig. 14a), contacts K5a, thence serially through the b and c contacts of the checking circuit to the magnet R7, wire 163 (Fig. 14), contacts R5a and 116, to line 153. A parallel circuit extends from contacts K5a, through wire 164, contacts R12a, wire 165, serially through the b contacts in the upper checking circuit to magnet R8, wire 163, contacts R5a, 116 to line 153. In this manner, sensing of the 5 perforation in card C accompanied by depression of the 5 key 117 will cause energization of both verification relay magnets R7 and R8. These relay magnets are constructed with a double winding, one of which is termed a "pick-up winding" and the other a "holding winding" coiled about a common core to operate common sets of contacts. In the circuit diagram for purposes of simplicity the pick-up and holding coils are shown separated, but on the other hand it is indicated which coil is the pick-up and which is the holding coil. Thus, when the pick-up coil of magnet R7 in Fig. 14a is energized, it closes its contact R7a in Fig. 14, thereby establishing a circuit through the holding coil of the magnet which is traceable from line 152, contacts 35, wire 160, holding coil of magnet R7, contacts R7a, contacts R5a, 116 to line 153. In the same manner the pick-up coil R8 closes contacts R8a to energize the holding coil of the magnet through a parallel circuit.

The magnets R7 and R8 each have a pair of b contacts (Fig. 14a) designated R7b and R8b which are connected in series and, when both are closed, complete a circuit traceable from line 152 (Fig. 14), contacts 35, wire 159 (Fig. 14a), contacts R8b, R7b, R6b, escapement magnet 40, switch 166, to line 153. Energization of magnet 40 will operate the escapement mechanism to advance the card to the next column and in doing so the escapement dog in Fig. 6 will momentarily open contacts 149 and close contacts 148. The latter will complete a circuit from line 152 (Fig. 14), contacts 35, wire 154, contacts 148, pick-up coil of relay magnet R5, contacts 116 to line 153. Magnet R5 will open its contacts R5a to drop out the holding circuits for the verification magnets R7 and R8.

*Verifying alphabetic punching*

Let us assume now the punching of an alphabetic character is to be verified, for example, the letter G represented in column 3 of Fig. 10 by perforations in the 7 and 12 index point positions. Sensing of this column will cause energization of the relay magnets C7 and C12. When the alphabet key 131 for the letter G is depressed, the appropriate pairs of contacts 135 will be closed to energize the magnets K7 and K12, the circuits for the latter being traceable from line 152, contacts 35, wire 154, bail contact 144 (closed as a result of operation of any of the alphabet keys), two pairs of contacts 135 for the G key, thence in parallel through wires 167 and 168 to the K7 and K12 magnets, contacts 96 now closed, contacts R5a, 116, to line 153.

The wiring arrangement between the alphabet key contacts 135 and the K magnets is arranged in accordance with the coding table set forth hereinabove, so that the magnets will be energized in combinations according to the coding. The magnet C7 will open its b contacts to break the lower checking circuit which will be recompleted by the contacts K7c, so that the concurrent closure of the contacts K7a will establish the circuit through the verification magnet R7. Similarly, in the upper checking circuit the magnet C12 will open its contacts C12b to break the checking circuit which is reestablished by the closure of contacts K12c, so that the concurrent closure of contacts K12a will enable energization of the second verification relay R8, the energization of the two relays R7 and R8 establishing the circuit for energization of the escapement magnet 40 to cause the card to present the next column to the sensing brushes.

Where the alphabetic character to be verified is a combination of the 0 hole and one of the other digits, it is seen that the related C magnets will open the lower checking circuit at two points, that is, contacts C0b will open and if, for example, the second perforation is in the 3 position, the contact C3b will also open and the related K contacts will reestablish the circuit at these two points if the corresponding K magnets are energized as a result of depression of the proper key. In this case the first verification magnet R7 will be energized through both the K0a contacts and the K3a contacts while the second verification magnet R8 is energized through a circuit including the relay contacts R12a, as explained in connection with the verification of a digital perforation.

Space key operation

For the verification of a blank or a non-perforated column, the operator may depress either the space bar 140 or the space key 117S. If the column sensed contains no perforations, there will, of course, be no C or K magnets energized. Depression of the space key 117S will close its contacts 124s (Fig. 14) and also the ball contacts 123, so that a circuit is traceable from the 152, contacts 35, wire 154, contact 123, contact 124s, wire 169 (Fig. 14a), contacts R12a and through the upper checking circuit to energize magnet R8. A parallel circuit extends from wire 169 through the lower checking circuit to energize the magnet R7.

If the space bar 140 is utilized, contacts 144 (Fig. 14a) are closed causing energization of relay magnet R11 which closes its contacts R11b (Fig. 14a) and contacts R11a in Fig. 14. A circuit is established traceable from line 152, contacts 35, wire 159 (Fig. 14a), contacts R11b, wire 164 and thence in parallel through the upper and lower checking circuits to energize the magnets R8 and R7 to effect escapement. As explained hereinabove, the circuits through magnets R7 and R8 continue through wire 163 and the contacts R5a of Fig. 14 which will hold the magnets energized until the card carriage escapes and causes closure of contact 148 which in turn energizes magnet R5 to open contacts R5a. The magnet R5 also closes its contact R5b in the upper part of Fig. 14 to energize the holding winding of the magnet which is sustained by a circuit from line 153, wire 170, holding coil of magnet R5, contacts R5b, relay contacts R11a, contacts 35 back to line 152. The purpose of the holding circuit for magnet R5 is to prevent the sustained depression of the space key or space bar from effecting more than a single escaping operation.

Indication of an error

From what has been explained above, it is apparent that, when the perforations in the column sensed agree with the key operated, a magnet or magnets C will be energized and the corresponding magnet or magnets K will also be energized and in the case of a blank column, none of these magnets will be energized, resulting in the energization of both verification magnets R7 and R8 which control the escapement of the card to the next column. Under conditions of disagreement where either a K or a C magnet is energized without accompanying energization of the other corresponding magnet, one or both of the magnets R7 and R8 will not be energized so that the escapement magnet circuit cannot be completed and the error circuit through the d or c contacts of the C magnets will energize the error relay R6. When the pick-up winding of this magnet is energized, its contacts R6a (Fig. 14) are closed and the holding winding is energized and held in the same manner as the holding coils of the magnets R7 and R8. In parallel with this holding coil is an indicating lamp 171 which then lights and remains so, indicating to the operator that an error has been detected either in the arrangement of the perforations on the card or that the operator has not pressed the proper key. Upon detection of an error therefore, the column being verified is not advanced but remains in sensing position and the indicating lamp 171 remains lighted.

If the operator wishes to recheck this column, it is necessary to break down the holding circuit of lamp 171 and relay R6. This is done by pressing against the finger piece 110 (Figs. 1 and 5) to effect opening of contacts 116 without disturbing the position of the card carriage. Opening of contacts 116, as seen from Fig. 14, will return the circuits to their normal condition and the operator may again depress one of the keys. If the correct key is now depressed, the card will escape to the next column.

In Fig. 14 there is provided a switch 172 which, when in dotted line position, will prevent the operator from effecting any reverification by opening contacts 116 inasmuch as the switch short circuits these contacts and prevents such action. It is, therefore, necessary for the operator upon the indication of an error to fully release the card carriage so that the remainder of the card passes uninterruptedly by the sensing brushes and the card is ejected. This release is effected by depressing either the release key 117R or the key 131R (Figs. 1 and 14a). Depression of either key will complete a circuit through the release magnet 60. Thus, for example, if key 117R is depressed, a circuit is traceable from line 152, wire 173, contacts 129a, magnet 60 to line 153. This release magnet as explained in connection with Fig. 2 will free the carriage for uninterrupted movement toward the left. A parallel circuit is also established when key 117R is depressed which is traceable from line 152, wire 173, contacts 129, wire 174, the escapement magnet 40, switch 166 to line 153. With switch 166 in its closed position, this circuit has no effect at this time. With the switch in open position, the circuit will include the relay magnet R13 which controls card ejecting operations which will be explained in greater detail later.

Checking "X" punched columns

As explained in connection with the cards, certain selected columns are predetermined to receive the special X hole, in which column there may or may not also be a digital perforation. To illustrate the operation of checking such column, let us assume that a column perforated such as column 7 (Fig. 10) is at the sensing position. According to Fig. 10, this column is perforated with an X hole and a 4 hole and the corresponding column of the M card which is also now at its sensing brushes is perforated in the 0 position. Thus, when these two cards are in sensing position, circuits will be established as already explained to energize the relay magnets C11 and C4 which initially break the upper and lower checking circuits (upper part of Fig. 14a). Sensing of the 0 hole in the M card will complete a circuit which is traceable from line 152, contacts 35, contacts 149, to contact roller 105, thence through the 0 perforation in the card M to the 0 brush 101, relay magnet R12, contacts 96 now closed, contacts R5a, and 116, to line 153. Magnet R12 opens its contacts R12a (upper left hand corner Fig. 14a), thus breaking the connection between the wires 165 and 164. Magnet R12 also closes its contacts R12b in series with relay contact R10a to form a connection parallel to the wire 165. With this setting of the relays initially effected, the operator must now depress the 4 key 117 and the 11 key 117 if the card is supposed to have an X hole or, if the X hole is intended to be absent in the card, the operator must depress the 4 key 117 and the No-X key 118.

Assuming first the correct presence of an X hole and also the 4 hole, depression of the 4 key 117 will in the now familiar manner energize relay K4, closing its contacts K4c and K4a, the latter effecting completion of the lower checking circuit to energize the verification magnet R7. Since contacts R12a are now open, the contacts K4a are unable to coincidentally energize the second verification magnet R8. Depression of the 11 key 117 will energize the magnet K11 to cause closure of its contacts K11c and K11a, so that the upper checking circuit is now completed and magnet R8 is energized, so that with both R7 and R8 energized the card will be advanced to the next column.

In checking for a No-X hole condition, the operator will depress the No-X key 118 instead of the 11 key 117. Depression of key 118 will close contacts 130 (Fig. 14) to energize relay magnet R10 whose contacts R10a (upper left hand corner of Fig. 14a) will complete a circuit from wire 159, contacts R10a, R12b now closed, through the remainder of the upper checking circuit to energize relay magnet R8.

Under the condition where the special column contains only the X hole without any accompanying digital perforation, the operator is required to operate the 11 key 117 or the No-X key 118 the same as before and in addition depress the space key 117S. The operation of the space key as explained above will cause energization of the verification magnet R7 if the digital positions in the card column are unperforated, and the X or No-X keys will control the energization of magnet R8.

Briefly summarizing this type of operation, whenever a card column is presented to the sensing brushes, which column has been preselected to receive special control perforations in the 11 or 12 positions, which may or may not be accompanied by a digital perforation, the operator is required to check for the presence or absence of the digital perforations as a separate operation from the checking for the X or No-X hole condition. Here again, if the energization of the C and K magnets is not in agreement, the error magnet R6 will be energized and held.

*Automatic verification*

If the card column under the sensing brushes contains perforations which are known to be correct, due to their having been made by some automatic means as a gang punch but which it is nevertheless desired to verify, the master card M is perforated with the same perforations. For example, the column 13 (Fig. 10) contains a perforation in the 11 position which is supposed to be present in each of the cards passed through the machine. Accordingly, as explained, the 11 position of card M is also perforated and thus, when these two columns arrive at their respective sensing positions, the C11 magnet is energized in the now familiar manner. The perforation in the M card establishes a circuit from line 152, contacts 35, wire 154, contacts 149, contact roller 105, the 11 perforation to the 11 brush 101, magnet K11, to line 153 as before. We thus have the magnets C11 and K11 automatically energized upon presentation of the column in question to the sensing brushes and the verifying magnets R7 and R8 are energized through the lower and upper checking circuits in the same manner as though the operator had depressed the 11 key 117 to manually check an 11 hole in any other column. Similarly, if some other position such as 12 were perforated in both cards, the magnets C12 and K12 would be energized to control the escapement of the card carriage. Of course, if through some error the supposedly present 11 or 12 hole were not in fact made in the card column in question, the checking circuits would not both be made and in their stead the error circuit would be completed to energize the error magnet R6 in the same manner as though an error occurred in a manually checked position.

*Combined automatic and manual verification*

Where there is a condition such as exemplified in column 15 of Fig. 10, with a gang punch X hole and in addition a manually punched 7 hole, the card M is provided with a hole in the 11 position for automatic comparison with the 11 hole in card C and also is provided with a 0 hole which, as explained, causes energization of relay R12 to open the contact R12a so that the automatic comparison between the 11 holes will now only energize the second verification relay magnet R8 and requires the operator to depress the 7 key 117 before the lower verification magnet R7 can be energized. In this case also, if one of the holes in the card C is missing or a hole has inadvertently been made in some other position, the magnets R7 and R8 will not be both energized and the error magnet R6 will function.

*Interlock relay*

The magnet R5 (Fig. 14) is provided to prevent repeated operation of the escapement magnet due to the operator holding any keys depressed, where two or more successive columns contain identical perforations. For example, if a column being verified contains perforations representing the letter O, the operator's depression of the O key 131 would result in energization of the escapement magnet escaping the card to the next column but, if this column contains perforations also representing the letter O, the continued depression of the O key 131 would again result in energization of the escapement magnet. As explained, the first comparison picked up the magnets R7 and R8 and provided a holding therefor through the contacts R5a. The first operation of escapement magnet would close contacts 148 to energize relay magnet R5 to break this holding circuit. It is now necessary to maintain the magnet R5 energized until the operator has released the depressed key. For this purpose, the magnet R5 has a holding winding (upper part of Fig. 14) which is held through a circuit from line 152, contacts 35, bail contacts 144, contacts R5b, holding winding of magnet R5, wire 170 to line 153. Accordingly, a second energization of the magnets R7 and R8 cannot take place until contacts R5a again close which in turn cannot take place until the key has been released to enable reopening of the bail contact 144. Similarly, where successive columns contain the same digital perforation, the holding circuit for magnet R5 is through the bail contact 123 of the numerical keyboard and this circuit is not released until the numerical key 117 is released.

Skip key operation

When the skip key is energized to close contacts 135s (Fig. 14a), a circuit is completed therethrough from line 152, contacts 135s, pick-up winding of magnet R3, to line 153. This closes the contact R3b providing a holding circuit from line 153, magnet R3, contacts R3b, wire 175 (Fig. 14), contact 148 (closed as will be described presently), wire 154, contact 35 to line 152. A parallel circuit to the upper pair of contacts 135s is traceable from these contacts through contacts R6b (Fig. 14a), escapement magnet 40, switch 166, to line 153. The escapement magnet by operating the stepping dog will cause closure of contacts 148, so that the holding circuit for magnet R3 just traced can be completed. If at the card position in which the skip key is operated the skip bar is provided with a high portion in line with the skip lifter (Fig. 7), the carriage will be released for uninterrupted movement an extent depending upon the length of the high portion of the skip bar. This movement is initiated by the skip magnet 56 (Fig. 14a) which is wired in series with the holding coil of magnet R3 so that it is energized concurrently therewith. Magnet R3 also opens contacts R3a (Fig. 14) to deenergize the reading brush magnet circuits so that during the period of skipping the brushes are held away from the cards. To insure the brushes being continuously held away from the card throughout the duration of the skip, the contacts 59 (Fig. 14) which are closed all the while the skip lifter is raised will energize magnet R2 causing it to open its contacts R2a in the brush magnet circuits.

The skip key is used whenever it is desired to skip one or more columns, regardless of whether or not these columns contain perforations. As explained, depression of the skip key will energize the escapement magnet 40 which in turn causes closure of contacts 148 to energize the interlock magnet R5 opening its contacts R5a, whereby no circuit can be completed through the verification magnets R7 and R8 or the error magnet R6. As the reading brushes are out of cooperation with the cards during the skipping, no further circuits to the C and K magnets can be completed. To prevent the operator from skipping any columns after an error has been indicated, the error relay R6 is provided with contacts R6b (Fig. 14a) in circuit with the skip key contacts, so that, when a card upon checking is found to be in error, the skip key cannot be used to advance this column past the brushes and requires the operation of the release key to completely advance the card. Of course, as explained, the manual opening of contacts 116 (Fig. 14) enables the operator to make a second check. Provision may be made to lock the switch 172 in permanently closed position so that, once an error has been indicated, there is no recourse but to depress the release key and remove the card from the machine.

Card ejecting controls

Under control of the various keys, the record card C ultimately arrives in the so-called last column position. Provision is made to cause the card to be automatically passed into the eject magazine as soon as it arrives in the last column position or to cause the card to stop in this position for the manual initiation of the ejecting operation. The manual ejecting operation will first be described. With the card in the last column position, contacts 145 (Fig. 14a) are closed. The operator by depressing the stacker key 131T to close contact 135T will complete a circuit from line 152, contacts 145, contacts 135T, eject magnet 79 to line 153. Energization of magnet 79 will trip the eject fingers gripping the leading edge of the card to flip it over into the eject magazine and the mechanism involved in this operation will cause closure of the auto start contacts 84 which in turn permit completion of a circuit from line 152, contacts 145, contacts 84, the trip magnet 32, contacts 95 to line 153. This circuit, of course, will not be completed unless the brush magnet 92 is deenergized, enabling closure of contacts 95. To insure that the brush magnet is deenergized at this time, a relay magnet R4 is energized upon closure of contacts 145, the contacts R4a (Fig. 14) of this relay accordingly opening the circuit to the brush magnets when the card is in the last column position.

Energization of trip magnet 32 will cause opening of contacts 35 and closure of contacts 36, the contacts 36 completing a circuit from line 152 (Fig. 14), contacts 36, wire 176 (Fig. 14a), motor 22, contacts 95 to line 153. Operation of the trip magnet also mechanically trips the driving clutch so that the operation of motor 22 now advances the next card from the magazine 10 to the sensing position and resets the ejecting fingers in preparation for ejection of the next card.

When it is desired to have the card ejected immediately upon arrival in its last column position without verifying the last column, switch 166 (Fig. 14a) is in open position so that magnet R13 becomes energized with the escape magnet 40 upon verification of the next to the last column. Magnet R13 closes its contacts R13a (at the bottom of Fig. 14a) setting up a holding circuit for the magnet traceable from line 152, contacts 145, contact R13a, holding coil of magnet R13 to line 153. When contact 145 is closed, a circuit is immediately traceable from line 152, contacts 145, contacts R13a and eject magnet 79 to line 153.

The aforedescribed ejecting operation has assumed that the last column of the card is not to be verified. In the event that it is to be verified, switch SW2 is opened to require operation of the stacker key 131T. The switch 166 (Fig. 14) is closed and switch SW1 (Fig. 14) is closed. The result of this is that, when the card arrives in last column position, relay magnet R4 is energized and serves to keep the brush magnets 92 and 104 energized through a circuit traceable from line 152, contacts 35, wire 154, contacts 149, switch SW1 now closed, contacts R4b now closed, contacts R3a which are normally closed, contacts R1b previously closed under control of the card lever contacts, contacts R2a which are normally closed, brush magnets 92 and 104 in parallel, contacts 116 to line 153. Now the operator depresses the appropriate keys to verify the last column which, if found to be correct, will cause energization of the escapement magnet 40 in the now familiar manner. Operation of the stacker key 131T will now cause ejection of the card as explained.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a verifying machine, means for advancing a perforated record card, said card having a column of index point positions in one or more of which positions perforations may be made, a circuit including means for controlling said advancing means, means for sensing the card column, a pair of sets of relays, one set being controlled by the sensing means in accordance with the perforations in part of the index point positions and the other set being controlled by the sensing means in accordance with the perforations in the remaining index point positions, a set of keys, one for each index point position, a second pair of sets of relays, one set being controlled by the keys related to certain index point positions and the other set being controlled by the keys related to the remaining index point positions, a pair of relay magnets each controlled by a pair of sets of relays and means jointly controlled by said magnets for completing said circuit.

2. In a verifying machine, means for sensing a column of a record card having a plurality of index point positions, in which column multiple perforations may be made, a series of keys, one for each index point position, a system of relays controlled by less than all of said keys and the part of the sensing means related to the corresponding index point positions, a second system of relays controlled by the remaining keys and the remaining part of the sensing means, a magnet for each system, each magnet being energized by its related system when one of the related keys operated corresponds to a perforation sensed, a control circuit and means jointly controlled by said magnets for completing said circuit when all keys operated correspond to all perforations sensed.

3. The invention set forth in claim 2 in which there is provided a signal circuit, a magnet controlled by either relay system when a related key is operated without the sensing of a corresponding perforation and means controlled by said magnet for completing said signal circuit.

4. In an electric verifying machine, means for sensing a column of index point positions in a record card, a series of keys one for each index point position, a pair of comparing circuits, a magnet in each circuit, a control circuit completed when both magnets are energized, said pair of comparing circuits being arranged to be concurrently completed under joint control of any key and said sensing means when the key cperated corresponds to a perforation sensed, selectively controlled means to cause only one comparing circuit to be completed when any one of part of said series of keys is operated and the other comparing circuit to be completed when any of the remaining part of said keys is operated, whereby a key in each of said parts is required to be operated to effect completion of said control circuit.

5. The invention set forth in claim 4 in which the selectively controllable means comprises a switching device and an operating means therefor.

6. The invention set forth in claim 4 in which the selectively controllable means comprises a switching device and a perforated record controlled operating means therefor.

7. In a verifying machine for verifying a column of a record card having a plurality of index point positions divisible into digit representing positions and zone positions, a set of keys one for each index point position, sensing means for sensing the card column, comparing means controlled by the sensing means and the keys related to the digit positions for verifying the perforations in the digit positions, a separate comparing means controlled by the sensing means and the keys related to the zone positions for separately verifying the perforations in the zone positions, a control circuit, means jointly controlled by both comparing means for completing said control circuit and settable means operative when in one position to cause any of said keys to control both comparing means and when set in another position to cause each key to control only its related comparing means.

8. The invention set forth in claim 7 in which a special key is provided with means for controlling both said comparing means independently of said set of keys to effect completion of said control circuit.

9. In a verifying machine, sensing means adapted to sense perforations in the columns of a record card, means for advancing a record card past said sensing means column by column, a set of keys comprising two groups of keys, a comparing device for each group of keys, means controlled jointly by both said comparing devices for controlling the operation of said advancing means, selectively settable means arranged when in one position for rendering each comparing device responsive to only its related group of keys or when set in another position for rendering both responsive to either group of keys and means controlled by said advancing means for selectively determining for each column sensed which position said settable means shall take and for effecting the setting accordingly.

10. The invention set forth in claim 9 in which the means controlled by the advancing means comprises a perforated card and sensing means therefor.

11. In an electric verifying machine, means for sensing multiple perforations in a column of a record card, means for moving the card past said sensing means column by column, a series of keys, one for each index point position, means jointly controlled by said sensing means and said keys and operative separately for each column for verifying the perforations in the columns, and means controlled by said moving means and effective separately for each column sensed for selectively requiring actuation of either one or more than one key to operate said verifying means for each column of the card.

12. In a verifying machine, a card carriage arranged to receive and support an original record card and a pattern card, a sensing means for each card, escapement mechanism for the carriage, said pattern card having perforations in columns thereof representing a pattern conforming to the location of perforations in columns of the original card, means controlled by both of said sensing means for comparing corresponding columns of both cards in succession, and means controlled by said comparing means, upon sensing of a pair of corresponding columns and detecting a disagreement between the perforations in the column of original record being verified and the corresponding column of the pattern formed by the perforations in the pattern card for interrupting further movement of the cards.

13. In a verifying machine, means for sensing a record card column by column for digit representing perforations therein, an error indicating circuit, means controlled by said sensing means upon sensing a perforation in a column for partially completing said circuit in response to the sensing of any digit representing perforation, a plurality of digit representing keys, a space key, means for sensing a control perforation in a pattern card, and means controlled either by said space key, said pattern card sensing means or any of said digit keys other than the one related to the digit representing perforation sensed for completing said error indicating circuit.

14. In a verifying machine, means for sensing a column of a record card for combinational perforations therein, comprising a digit representing perforation and a zone representing perforation, a series of alphabet representing keys, a series of digit and zone representing keys, verifying means controllable jointly by said sensing means and one of said alphabetic keys or jointly by said sensing means, a digit key and a zone key, and settable means operative for selectively rendering said verifying means responsive to either of said joint controls.

ORVILLE B. SHAFER.